SANFORD, MALLORY & HAYES.
Hemp and Flax Brake.
No. 36,675. Patented Oct. 14, 1862.
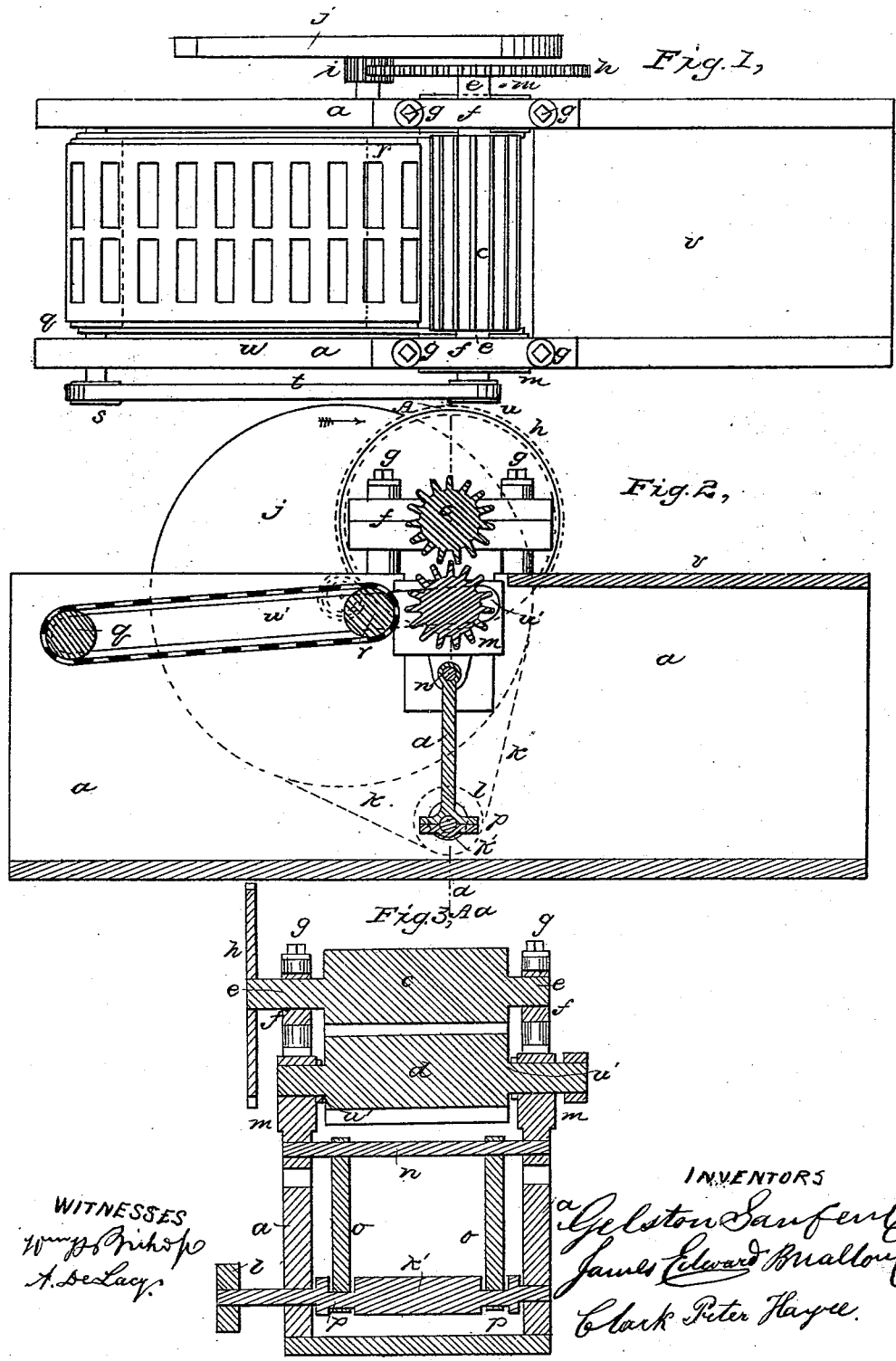

UNITED STATES PATENT OFFICE.

GELSTON SANFORD, JAMES E. MALLORY, AND CLARK P. HAYES, ALL OF NEW YORK, N. Y.

IMPROVEMENT IN MACHINES FOR BREAKING FLAX, HEMP, &c.

Specification forming part of Letters Patent No. 36,675, dated October 14, 1862.

*To all whom it may concern:*

Be it known that we, GELSTON SANFORD, JAMES E. MALLORY, and CLARK P. HAYES, of the city, county, and State of New York, have invented a new and useful Improvement in the Machine for Breaking Flax, Hemp, and other like Fiber-Yielding Plants; and we do hereby declare that the following is a full, clear, and exact description thereof, reference being had to the accompanying drawings, making part of this specification, in which—

Figure 1 is a plan of the machine; Fig. 2, a longitudinal vertical section, and Fig. 3 a cross vertical section taken at the line A $a$ of Fig. 2.

The same letters indicate like parts in all the figures.

Our said invention relates to an improvement on that class of machines which break the flax by causing it to pass between fluted rollers; and our said invention consists in giving to one or more of the fluted rollers a reciprocating motion toward and from the other fluted roller or rollers, so that in addition to the breaking action of such fluted rollers, due to their rotation and the bending of the flax alternately in opposite directions, they shall have a beating action on the flax or other plant, whereby the woody part of the plant is more effectually broken into minute fragments and separated from the fibers; and our said invention also consists in combining with fluted rollers for breaking, an endless apron or belt of open-work having a shaking motion to receive the fibers as they are delivered from the rollers and shake out the broken fragments of the woody part of the plant.

In the accompanying drawings, $a$ represents a suitable frame, and $b$ a table on which the flax or other plant to be broken is placed and spread and presented to the bite of two fluted rollers, $c$ and $d$. The shaft $e$ of the upper roller, $c$, has its bearings in boxes $f f$, that are fitted to slide on vertical rods $g g g g$, with india-rubber or other springs above and below, that the roller may yield to any undue pressure. The shaft $e$ of this upper roller is provided with a cog-wheel, $h$, which receives motion from a pinion, $i$, on the arbor of a belt-wheel, $j$, which in turn receives motion by a belt, $k$, from a pulley, $l$, on the driving-shaft $k'$. The shaft of the lower fluted roller, $d$, has its bearings in sliding boxes $m\ m$, and there is a rod, $n$, below the roller, extending across from the one to the other of the said boxes, and from this rod two connecting-rods, $o\ o$, extend down to and embrace two cranks, $p\ p$, of equal throw on the driving-shaft $k'$. The two rollers $c$ and $d$ are so set that the flutes on their surfaces interlock, notwithstanding the up and down motion of the lower one, and as the flutes interlock the rotation of the upper roller imparts rotary motion to the lower one; but, if desired, the two rollers may be geared by cogged gearing in any suitable manner. As the flax or other plant to be broken is carried through between the fluted rollers, the woody part is broken by the action of the flutes bending it alternately in opposite directions, and while this is going on the rapid up and down motion of the lower roller produces a beating action against it, which not only insures the breaking, but at the same time has a tendency to pulverize and separate the woody and other foreign substances from the fibers. As the broken material passes through, it is delivered on the other side on an endless apron or belt made with numerous apertures. We prefer to make this apron of what is known as "india-rubber cloth" cut through so as to present an open grating. This apron passes around two rollers, $q$ and $r$, the shaft of the roller $q$ being provided with a pulley, $s$, to receive a belt, $t$, from a pulley, $u$, on the shaft of the fluted roller $d$, by which the apron is caused to travel at about the same velocity as the periphery of the fluted rollers. The shaft of the other roller, $r$, is mounted in two bars, $u'\ u'$, attached to the sliding boxes $m\ m$ of the lower fluted roller, the opposite ends of the said bars being pivoted. By reason of this connection the apron receives a shaking motion to shake out of the fibers the broken woody fragments and other impurities from the fibers, as they are carried off from the breaking-rollers.

Instead of giving the beating motion to the lower roller, it may be given to the upper roller; and it will be obvious that the number of rollers may be increased, that the apron may be made of other material, and that the required motions may be given by other and equivalent means.

We are aware that it has been proposed to give a reciprocating beating motion in connection with a rotary motion to one of a pair of cleaners composed each of a series of radial slats attached by their ends to rotating heads, the flax being first broken by being first passed between fluted breaking-rollers not having any reciprocating or beating action; but these reciprocating and rotary cleaners do not perform on the flax or other plant the operations which we desire to have performed and which are performed by our said invention. One series of radial slats act on one side of the bunch and bend it in the spaces between the other series of slats, simply bending it alternately in opposite directions; but at no time is the flax or other plant pounded and rubbed between two opposing surfaces; and it is this mode of operation which mainly distinguishes our said invention from the said prior invention. We do not therefore wish to be understood as making claim, broadly, to giving to instruments which operate on opposite sides of a bunch of flax or other fiber-yielding plants a reciprocating beating in addition to a rotary motion, but desire to be understood as limiting our claim to giving such compound motions to fluted rollers, so that by such compound motions the flax or other plant shall be broken and pounded between two opposite fluted surfaces and rubbed, and the woody fragments liberated from the fibers by the rubbing action induced by the interlocking of the flutes of the two rollers as they rotate.

What we claim as our invention, and desire to secure by Letters Patent, is—

1. Giving to one or more of the fluted breaking-rollers a vibrating or beating motion, in combination with the rotary motion, substantially as and for the purpose specified.

2. In combination with the breaking-rollers or their equivalents, giving a vibrating or shaking motion to the pervious apron, substantially as and for the purpose specified.

GELSTON SANFORD.
JAMES EDWARD MALLORY.
CLARK PETER HAYES.

Witnesses:
  WM. H. BISHOP,
  A. DE LACY.